3,355,454
N-TRIFLUOROMETHYLAMINES AND PROCESS FOR THEIR PRODUCTION
Erich Klauke, Cologne-Flittard, and Engelbert Kühle, Cologne-Stammheim, Germany, assignors to Farbenfabriken Bayer Aktiengesellschaft, Leverkusen, Germany, a corporation of Germany
No Drawing. Original application Apr. 23, 1963, Ser. No. 274,916. Divided and this application Sept. 28, 1965, Ser. No. 491,015
Claims priority, application Germany, May 15, 1962, F 36,896
6 Claims. (Cl. 260—249.5)

The present invention is a divisional application of U.S. patent application, Ser. No. 274,916, filed April 23, 1963, now abandoned, and relates to novel N-trifluoromethylamines which have marked fungicidal and herbicidal properties, as well as a process for their production.

Few N-trifluoromethylamines are known from the literature. Two compounds from the aromatic series have been described. K. A. Petrov and A. A. Neimysheva (Z. Obsc. Chim. 29, 2169 (1959)) obtained N-trifluoromethyl-aniline and p-N-trifluoromethyl-toluidine by the reaction of the corresponding isocyanide-dichlorides with anhydrous hydrofluoric acid in an organic solvent. According to the statements by these authors, the choice of the employed organic solvent is of decisive significance during this operation. Thus, the production of N-trifluoromethylamine can only be achieved in ether. In the presence of ethyl chloride or in the absence of a solvent, polymeric isocyanide-diffuorides are isolated as the main product of the reaction. The chemical structure of these polymeric reaction products is not specified.

It is an object of the present invention to make available novel N-trifluoromethylamines. It is a further object of the invention to disclose a process for the production of the novel N-trifluoromethylamines. Moreover, it is also an object of the invention to provide novel materials which can be employed for the control of fungi and weeds by virtue of their fungicidal and herbicidal properties. Further objects are indicated by the following decsription and the examples.

It has been found that the novel N-trifluoromethylamines of the formula

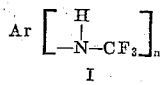

I wherein Ar represent an aromatic, carbocyclic, heterocyclic, or condensed radical, optionally substituted by alkyl, alkoxy, and/or acyloxy, which is substituted by at least one of the following substituents halogen, nitro, nitrile, trifluoromethyl, —COX, and —SO₂X, where X represents halogen, alkoxy, alkyl, or aryl, and $n$ stands for 1 or 2, have fungicidal and herbicidal properties.

It has further been found that the N-trifluoromethylamines of Formula I are obtained when isocyanide-dichlorides of the formula

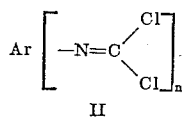

II wherein Ar and $n$ have the same significance as in Formula I, are reacted with an excess of anhydrous hydrofluoric acid.

During the process according to the invention, the use of an organic solvent may be dispensed with, and this constitutes a considerable simplification of the reaction and of working up, particularly since solvents such as ether form stable oxonium salts with hydrofluoric acid which can be distilled.

The starting materials which can be employed for the process according to the invention are plainly characterised by the above stated Formula II. In this formula, Ar preferably represents aromatic radicals with up to 10 carbon atoms, carbocyclic radicals with 5–6 ring members, heterocyclic radicals with 5–6 ring members, and condensed radicals such as benzophenone, for example. These radicals represented by Ar may be substituted by one of the following substituents: halogen such as chlorine, bromine or fluorine; nitro, nitrilo, trifluoromethyl, as well as the —COX and —SO₂X radicals wherein X preferably represents halogen such as chlorine, bromine, and fluorine, alkoxy groups with 1–4 carbon atoms, alkyl groups with 1–4 carbon atoms, or phenyl. In addition to the substituents mentioned above, the groups represented by Ar may also be substituted by alkyl, alkoxy, and/or acyloxy groups each with 1–4 carbon atoms.

The isocyanide-dichloride required as the starting materials for obtaining the products of the process according to the invention may be prepared by different methods, for instance by the chlorination of isothiocyanates (Ber. 7, page 1228), by the chlorination of N-arylformamides in thionyl chloride (German Patent No. 1,094,737), or by the chlorination of dialkyl-anilines at an elevated temperature.

Isocyanide-dichlorides which are prepared according to the above mentioned processes and are suitable for the reaction with anhydrous hydrofluoric acid are, for instance:

4 - chlorophenyl - isocyanide-dichloride; 2,5 - dichlorophenyl-isocyanide-dichloride; 2,4,6 - trichlorophenyl-isocyanide-dichloride; pentachlorophenyl-isocyanide-dichloride; 2,4-dichloro - 5-methylphenyl-isocyanide-dichloride; 2-methyl - 5-nitrophenyl-isocyanide-dichloride; 2-chloro-5-trifluoromethylphenyl-isocyanide-dichloride; 4-carboxymethylphenyl - isocyanide-dichloride; 3-cyano-phenyl-isocyanide-dichloride; diphenylsulphone - 2-isocyanide - dichloride; 4-benzophenone - isocyanide-dichloride; 4-benzoyl chloride-isocyanide-dichloride; and the like.

The term "anhydrous hydrofluoric acid" as employed for the reaction refers to the normal commercial product with a percentage content of 98–100%.

The reaction is conveniently carried out so that the excess of anhydrous hydrofluoric acid is first introduced and the isocyanide-dichloride is added dropwise to it at temperatures between —10 and +20° C. However, the order of addition may also be reversed, and this is always to be recommended when the starting material is a solid at room temperature. The progress of the reaction, which is usually very fast, is readily indicated by the liberated hydrogen chloride. The reaction is quantitative, in relation to the employed amount of isocyanide-dichloride, and the end point of the reaction can easily be recognized by the cessation of the evolution of HCl. After the excess of hydrofluoric acid has been expelled, working up of the reaction mixture is carried out by distillation of the residue or by recrystallisation. In most cases, however, the crude product is sufficiently pure and can be employed for subsequent reactions without further purification.

The compounds according to the invention possess herbicidal and fungicidal properties, and can therefore be employed for the destruction of weeds as well as for the control of fungi, particularly of phytopathogenic, wood-rotting, and wood-discolouring fungi.

The fungicidal activity of the compounds according to the invention is represented below by means of examples. The compounds according to the invention are investigated by the test known as the culture medium test, for their activity against wood-rotting, blue-rot, and also wood-discolouring fungi.

The tests are carried out by the usual method. Compositions of the active agents are prepared at different concentrations by taking up the active agent in about 4 times its weight of dimethylformamide, adding some poly-hydroxyethylene-benzyl ether as emulsifying agent, and diluting this concentrate to the desired concentrations with water. The compositions are added to a culture medium (malt/agar-agar). The culture medium is then inoculated with the test fungi. Four weeks after the inoculation, the concentration at which fungus growth still just takes place and the concentration at which this growth is completely inhibited are determined. These concentrations are referred to as "inhibition indices" and are stated in the two following tables for a large number of fungi. The statements of concentration relate to the percentage by weight of active agent referred to the composition.

INHIBITION INDICES AGAINST WOOD-ROTTING FUNGI

|  | Cl—⟨⟩—NHCF$_3$ (Percent) | Cl—⟨⟩—NHCF$_3$ (with Cl) (Percent) |
|---|---|---|
| Merulius domesticus | 0.04–0.2 | 0.01–0.04 |
| Polystictus versicolor | 0.04–0.2 | 0.04–0.1 |
| Polyporus vaproaria | 0.04–0.2 | 0.04–0.1 |
| Lenzites abientina | 0.04–0.2 | 0.04–0.1 |
| Coniophora cerebella | 0.04–0.2 | 0.01–0.04 |
| Lentinus lepideus | 0.04–0.2 | 0.04–0.1 |
| Chaetomium globosum | 0.04–0.2 | 0.04–0.1 |

INHIBITION INDICES AGAINST BLUE-ROT FUNGI

| Ophiostoma picea | 0.04–0.2 | 0.04–0.1 |
|---|---|---|
| Scopularia phycomyces | 0.04–0.2 | 0.04–0.1 |
| Trichosporium tingens | 0.04–0.2 | 0.01–0.04 |
| Pullularia pullulans | 0.04–0.2 | 0.1–0.4 |
| Endoconiophora coerulescens | 0.04–0.2 | 0.1–0.4 |
| Ophiostoma pini | 0.04–0.2 | 0.04–0.1 |

The following examples are given for the purpose of illustrating the invention. The term "parts" refers to parts by weight.

EXAMPLE 1

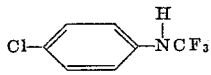

140 parts by volume of anhydrous hydrofluoric acid are first introduced into a copper vessel, cooled with brine and fitted with stirrer, reflux condenser and thermometer, and cooled down to −2° C. 417 parts of 4-chlorophenyl-isocyanide-dichloride are then run into this during the course of 50 minutes. A slow evolution of HCl ensues shortly after the start of the addition, which rapidly intensifies and which ceases 15 minutes after the addition has been completed. The excess of HF is evaporated in vacuo at 20° C. and the residue is distilled. 293 parts (=75% of the theoretical yield) of N-trifluoromethyl-4-chloro-aniline of B.P. 85° C./13 mm. Hg are obtained, with $n_D^{20}$ 1.4920.

EXAMPLE 2

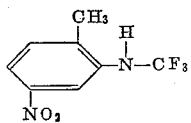

116.5 parts (0.5 mole) of 2-methyl-5-nitrophenyl-isocyanide-dichloride of M.P. 59° C. are first introduced into the apparatus described above. 120 parts by volume of anhydrous HF are added thereto within 2 minutes. A vigorous evolution of HCl ensues, which subsides after 75 minutes. After the excess of HF has been distilled off, 108 parts (98.2% of the theoretical yield) of N-trifluoromethyl-2-methyl-5-nitraniline are isolated in the form of yellow crystals of M.P. 81–83° C. M.P. 86–87° C. after recrystallising once from benzene.

EXAMPLE 3

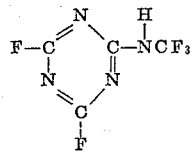

82 parts (0.33 mole) of 2,4-dichloro-sym-triazinyl-isocyanide-dichloride-6 (=tetrameric cyanogen chloride) are added dropwise to 100 parts by volume of previously introduced anhydrous hydrofluoric acid in an apparatus like that in Example 1. An intensive development of HCl starts at a temperature of about 10° C., which subsides only slowly since the chlorine atoms present at the 2- and 4-positions are exchanged during a second stage. The reaction is allowed to continue for 17 hours at a temperature between 15 and 20° C., the excess of hydrofluoric acid is then distilled off, and 62 parts (93.2% of the theoretical yield) of 2,4-difluoro-sym-triazinyl-6-trifluoromethylamine are obtained as the residue. The crude product can be distilled. Boiling point 80–83° C./20 mm. Hg, M.P. 53–55° C.

The following compounds were prepared by a method similar to that in the given examples:

B.P.: 88° C./15 mm. Hg

B.P.: 94–96° C./20 mm. Hg

B.P.: 90–92° C./5 mm. Hg

B.P.: 75–76° C./2.5 mm. Hg
M.P.: 40–42° C.

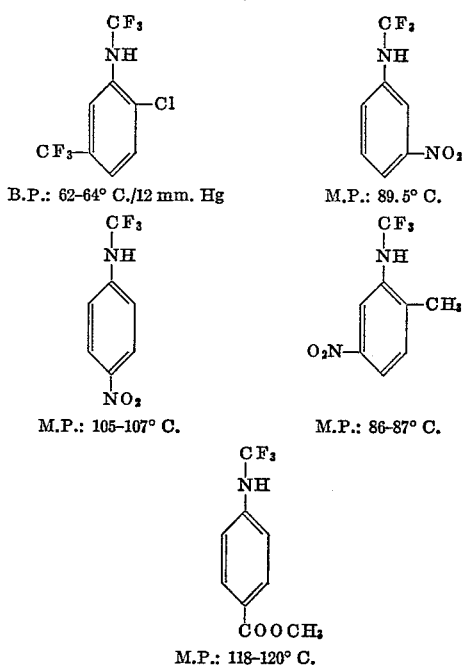

B.P.: 62-64° C./12 mm. Hg  
M.P.: 89.5° C.  
M.P.: 105–107° C.  
M.P.: 86–87° C.  
M.P.: 118–120° C.

We claim:

1. A process for producing N-trifluoromethylamines which comprises contacting isocyanate-dichlorides of the formula

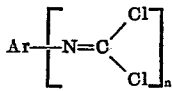

with at least a reactive amount of anhydrous hydrofluoric acid in the absence of an organic solvent, to obtain a product having the formula

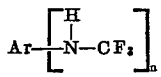

wherein Ar is a triazinyl, an aromatic nucleus having up to 10 carbon atoms and a substituted aromatic nucleus having as substituent group a member selected from the group consisting of chloro, methyl, nitro, trifluoromethyl, carboxymethyl, cyano, and

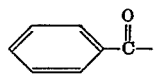

and $n$ is an integer of 1-2.

2. A process according to claim 1 wherein the reaction is effected at a temperature of about −10° C. to +20° C.

3. A process according to claim 1 wherein the isocyanate dichloride reactant is a member selected from the group consisting of 4-chlorophenyl-isocyanide-dichloride; 2,5-dichloro-phenyl-isocyanide-dichloride; 2,4,6-trichlorophenyl - isocyanide - dichloride; pentachlorophenyl-isocyanide - dichloride; 2,4-dichloro-5-methylphenyl-isocyanide-dichloride; 2 - methyl-5-nitrophenyl-isocyanide-dichloride; 2-chloro-5-trifluoromethylphenyl-isocyanide-dichloride; 4-carboxymethylphenyl - isocyanide - dichloride; 3 - cyanophenyl-isocyanide-dichloride; diphenyl-sulphone-2-isocyanide-dichloride; 4 - benzophenone - isocyanide-dichloride; and 4-benzoyl chloride-isocyanide-dichloride.

4. A process for producing a compound of the formula

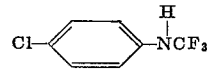

comprising admixing 4-chlorophenyl-isocyanide-dichloride with anhydrous hydrofluoric acid at a temperature of about −2° C., the ratio of isocyanide dichloride reactant to hydrofluoric acid being about 3:1 in parts by weight, and thereafter recovering the resulting product.

5. A process for producing a compound of the formula

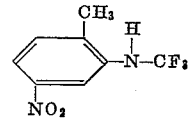

comprising slowly adding anhydrous hydrofluoric acid to 2-methyl-5-nitrophenyl-isocyanide-dichloride at a temperature of about −2° C., the ratio of reactants being about 1:1 in parts by weight, and thereafter recovering the resulting product.

6. A process for producing a compound of the formula

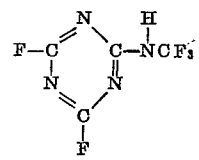

comprising slowly adding 2,4-dichloro-sym.-triazinyl-isocyanide-dichloride-6 to anhydrous hydrofluoric acid, the ratio of reactants being about 8:10 parts by weight, maintaining a temperature of about 10° C.–20° C., and thereafter recovering the resulting product.

References Cited
UNITED STATES PATENTS

| | | | |
|---|---|---|---|
| 3,122,542 | 2/1964 | Knusli et al. | 260—249.5 X |
| 3,137,694 | 6/1964 | Riethmann et al. | 260—249.5 |

OTHER REFERENCES

Petrov et al. Chemical Abstracts, 1960, volume 54, pages 10911 to 10912.

WALTER A. MODANCE, *Primary Examiner.*

CHARLES B. PARKER, *Examiner.*

D. R. MAHANAND, J. M. FORD, *Assistant Examiners.*